Oct. 25, 1955  J. SPENCER  2,721,601
METHOD OF FORMING PRINTING ROLLER CORES
Original Filed Nov. 20, 1950
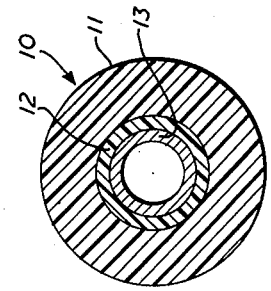
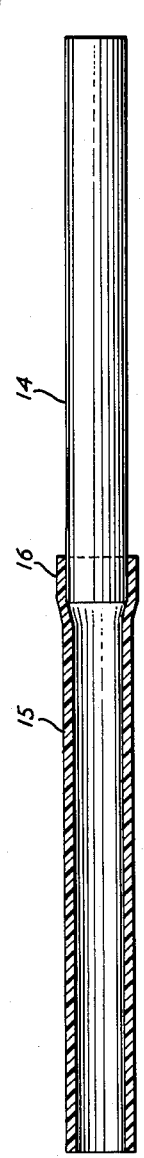
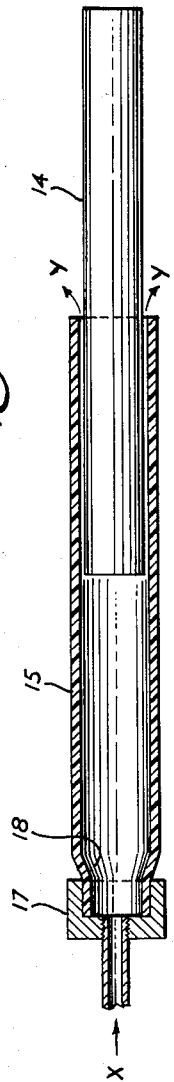
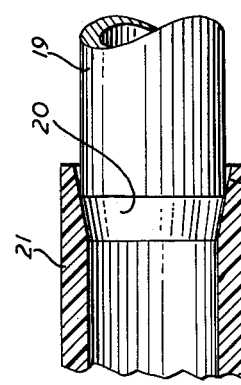
Inventor
JAMES SPENCER
by: Fetherstonhaugh & Co.
Att'ys.

United States Patent Office 2,721,601
Patented Oct. 25, 1955

2,721,601
METHOD OF FORMING PRINTING ROLLER CORES

James Spencer, Toronto, Ontario, Canada, assignor to Perma-Flex Industries Limited, Toronto, Ontario, Canada, a corporation of Ontario Original application November 20, 1950, Serial No. 196,539. Divided and this application February 14, 1952, Serial No. 271,476

1 Claim. (Cl. 154—41)

This invention relates to a printing roller and method of forming same, and is a divisional application of application Serial Number 196,539, filed November 20, 1950.

In my related applications Serial Numbers 735,297, filed March 18, 1947, now Patent No. 2,536,323; 47,182, filed September 1, 1948, now Patent No. 2,626,222; and 184,904, filed September 14, 1950, now abandoned, I describe a method and apparatus for forming printing rollers wherein the roller is formed over a suitable piece of shafting, which latter is usually of metal. A problem thus arises of providing a consistent base for the roller composition and which is particularly adapted to adhere to the latter. This problem is generally found in the art of making printing rollers, and in cases where such rollers are made of rubber compositions or the like there is often great difficulty in providing a sufficient bond between the rubber composition of the roller and its core or shaft support.

According to my invention, I select a length of roller shafting finished to a predetermined diameter and select tubing of elastic material having an inner diameter less than the said predetermined diameter of the shaft but adapted when mounted thereon to be stretched to less than substantially the elastic limit of the material. The tube is of a material which is adapted to make the desired bond with the roller composition placed thereabout to constitute the final roller. The tube is placed over the shaft by engaging one end of the tube with one end of the shaft and then air is introduced into the free end of the tube at sufficient pressure to cause the tube to expand and allow the shaft to be thrust thereinto. I may employ a suitable cement for bonding the tube to surfaces of the shaft.

The invention will be appreciated in more detail by reference to the following specification taken in conjunction with the accompanying drawings.

In the drawings:

Figure 1 shows a sectional view of a complete printing roller according to the invention.

Figure 2 illustrates a manner of inserting a roller shaft into a tubular roller composition support.

Figure 3 illustrates a further step in the method of Figure 2 and particularly the application of air under pressure to the inner surfaces of the tube to allow the shaft to be thrust thereinto.

Figure 4 illustrates an alternative in the method of Figures 2 and 3 particularly suitable for supporting tubes of relatively stiff elastic nature.

In the drawings, Figure 1 illustrates a printing roller 10 wherein the roller body has a resilient or yieldable outer layer 11 of any suitable composition such as defined in my related applications Serial Numbers 735,297, 47,182 and 184,904 i. e. plasticized resin. The roller layer 11 according to this invention is formed about the support tube 12, which latter is of a material more adaptable for bonding by means of heat in known manner with the material of the layer 11 than is the material of the roller shaft 13.

The tube 12 is of elastic nature, that is, it is a material having any suitable modulus of elasticity for the purposes contemplated herein. The support tube 12 is preferably of a material of the same chemical family as the materials used in making up the body of the roller. Thus, the roller may be made according to the following example disclosed in related application Serial Number 735,297 issued as Patent 2,536,323, January 2, 1951.

| | Parts by weight |
|---|---|
| Polyvinyl chloride | 100 |
| Di-octyl phthalate | 130 |
| Ester gum | 1 |

This composition gives a roller body suitable for high speed rollers with a slight amount of "tack" on the surface. I prefer, in accordance with the present invention, to select a material for the support tube 12 from the range of polymers or copolymers of polyvinyl chlorides. In this way, a bonding between the tubing and the roller body material may be achieved in a chemical sense. On the other hand, the bonding between the tubing and the metal core by reason of the tension in the tubing after placement of the metal core therein, as well as in cementing, is mechanically strong.

I mount the tube 12 on the shaft 13 in a special way as follows. In Figure 2 a selected length of shaft 14 is brought into engagement with the support tube 15 which latter is of a relatively pliable nature such as in the case of a firm grade of rubber. The tube 15 has an inner diameter less than the finished diameter of the shaft 14 and, therefore, it will be necessary to work one end 16 of the tube 15 to cause it to fit over one end of the shaft 14 as illustrated. Thereafter, as illustrated in Figure 3, a suitable air supply nozzle 17 is applied to the other end 18 of the tube 15 to cause introduction of air under pressure at X and effect diametrical expansion of the tube 15. As the shaft 14 is thrust into the tube, air will escape as indicated by the arrows Y in the interface between the inner surfaces of the shaft. It has been found that the shaft may thus be easily inserted into the tube. When the air pressure is relieved, the tube 15, by reason of its elastic nature, contracts tightly about the rigid core 14.

Where the tube is of a material of more rigid character, then the shaft 19 may carry a slight taper 20 at the free end thereof and also the inner surfaces of the tube 21 may carry a diverging taper 22. If desired, only one of these components need carry the taper in order to assist in starting the assembly of the components.

I may employ a cement applied to the shaft before assembly for assisting adherence between the tube and the shaft after assembly. Where the tube is of a thermoplastic material, it may be heated to cause softening thereof before application to the shaft. However, it will be appreciated that in this case the material should not be softened to the point where it will lose its elastic properties.

After assembly of the tube onto a shaft I prefer to machine the tube to provide a true shaft surface. In this way, in forming new rollers over old or reclaimed shafts it is possible to effect a great saving in shafting for the desired true surface need only be formed on the roller supporting tube by suitable machining.

It is intended that the present disclosure should not be construed in any limiting sense other than that indicated by the scope of the following claim.

What I claim as my invention is:

The method of forming a printing roller upon a rigid shaft comprising, inserting said shaft into a tube of thermoplastic material having elastic characteristics, said tube being of lesser internal diameter than the diameter of said shaft, by expanding said tube while inserting the shaft therein, securing said tube to said shaft by self-energized pressure of the tube with the addition of a cementing medium, depositing on said secured tube a printing roller body material of thermoplastic composition to substantial depth and capable of forming a bond with said tube, and bonding the said body of material and said tube as a unit.

References Cited in the file of this patent

UNITED STATES PATENTS

| Number | Name | Date |
|---|---|---|
| 1,608,206 | Freedlander | Nov. 23, 1926 |
| 2,006,364 | Morse | July 2, 1935 |
| 2,090,014 | Wiltse | Aug. 17, 1937 |
| 2,312,853 | Toland et al. | Mar. 2, 1943 |
| 2,329,796 | Stoffer | Sept. 21, 1943 |
| 2,333,800 | Lewis et al. | Nov. 9, 1943 |
| 2,518,834 | Streckfus et al. | Aug. 15, 1950 |
| 2,641,301 | Gerber et al. | June 9, 1953 |